(12) United States Patent
Krausz et al.

(10) Patent No.: US 7,997,626 B2
(45) Date of Patent: Aug. 16, 2011

(54) PIPE COUPLING WITH AUXILIARY CLAMP

(75) Inventors: Eliezer Krausz, Tel Aviv (IL); Avi Chiproot, Kfar-Saba (IL)

(73) Assignee: Krausz Industries Development Ltd, Tel Aviv (IL)

( * ) Notice: Subject to any disclaimer, the term of this patent is extended or adjusted under 35 U.S.C. 154(b) by 0 days.

(21) Appl. No.: 12/536,556

(22) Filed: Aug. 6, 2009

(65) Prior Publication Data

US 2011/0031737 A1 Feb. 10, 2011

(51) Int. Cl.
   *F16L 17/00* (2006.01)
(52) U.S. Cl. .................... 285/110; 285/369; 285/223
(58) Field of Classification Search ............. 285/420, 285/421, 406, 407, 343, 113, 223, 110, 111, 285/369, 367, 236
   See application file for complete search history.

(56) References Cited

U.S. PATENT DOCUMENTS

| | | | | |
|---|---|---|---|---|
| 1,364,529 A | * | 1/1921 | Thomas, Jr. | 285/149.1 |
| 3,176,064 A | * | 3/1965 | Browne | 174/78 |
| 5,563,374 A | * | 10/1996 | Hubert | 174/84 R |
| 5,941,576 A | * | 8/1999 | Krausz | 285/110 |
| 6,293,556 B1 | * | 9/2001 | Krausz | 277/549 |
| 7,219,934 B2 | * | 5/2007 | McMahon et al. | 285/420 |
| 7,243,955 B2 | * | 7/2007 | Krausz et al. | 285/236 |
| 2007/0024056 A1 | * | 2/2007 | Borland | 285/369 |
| 2007/0273151 A1 | * | 11/2007 | Krausz et al. | 285/406 |

* cited by examiner

*Primary Examiner* — Aaron Dunwoody
(74) *Attorney, Agent, or Firm* — Dekel Patent Ltd; David Klein

(57) ABSTRACT

A pipe coupling including at least one annular clamp housing at an end of a body, the at least one annular clamp housing having an opening for inserting therein a pipe and including clamp members and a tightening element that fastens and tightens the clamp members towards each other in a direction transverse to an axial length of the body so as to apply a radially-inward clamping force on a pipe inserted in the opening, at least one auxiliary clamp including auxiliary clamp members located near the at least one annular clamp housing, and an auxiliary tightening element that fastens and tightens the auxiliary clamp members towards each other in a direction transverse to the axial length of the body so as to apply a radially-inward clamping force on the pipe inserted in the opening.

10 Claims, 4 Drawing Sheets

PIPE COUPLING WITH AUXILIARY CLAMP

FIELD OF THE INVENTION

The present invention relates to a coupling for pipes, which has a pipe grip that prevents inadvertent axial separation of the pipes being coupled.

BACKGROUND OF THE INVENTION

Many kinds of removable band-type couplings for pipes exist in the art. It is noted that throughout the specification and claims, the term "pipe" encompasses any kind of generally cylindrical object.

US Patent Application 20070273151 to the present inventors, filed on 15 Feb. 2007, the disclosure of which is incorporated herein by reference, describes an improvement on a cast flange for pipe couplings. The improved flange and its seal are attachable to the external surface of a pipe and can be used to eliminate a small leak if access to a pipe extremity is available. Clamp members are positioned face to face and a tightening element is tightened to press an annular seal element against the outside of the pipe inserted through the seal clamp housing. The annular seal element returns to its original dimensions after release of the tightening element.

SUMMARY OF THE INVENTION

The present invention seeks to provide additional gripping capability to the pipe coupling of US Patent Application 20070273151 by providing one or more auxiliary clamps, as is described more in detail further below.

There is provided in accordance with an embodiment of the present invention a pipe coupling including at least one annular clamp housing at an end of a body, the at least one annular clamp housing having an opening for inserting therein a pipe and including clamp members and a tightening element that fastens and tightens the clamp members towards each other in a direction transverse to an axial length of the body so as to apply a radially-inward clamping force on a pipe inserted in the opening, at least one auxiliary clamp including auxiliary clamp members located near the at least one annular clamp housing, and an auxiliary tightening element that fastens and tightens the auxiliary clamp members towards each other in a direction transverse to the axial length of the body so as to apply a radially-inward clamping force on the pipe inserted in the opening.

In accordance with an embodiment of the present invention the at least one annular clamp housing includes an annular seal member which is radially squeezed when at least one of the tightening element and the auxiliary tightening element is tightened.

Further in accordance with an embodiment of the present invention the clamp members are mounted or integrally formed on a flange that extends from an end of the body. The flange may extend over a portion of the annular seal member.

In accordance with an embodiment of the present invention the at least one auxiliary clamp is positioned axially inwards of the at least one annular clamp housing. Alternatively, the at least one auxiliary clamp can be positioned axially or radially outwards of the at least one annular clamp housing.

In accordance with another embodiment of the present invention, the pipe coupling further includes an annular inclined surface extending axially from each of the clamp members, and a wedge-shaped gripper arranged for sliding and abutting against each of the annular inclined surfaces, wherein tightening at least one of the tightening element and the auxiliary tightening element applies a radially-inward clamping force on the pipe and a radially-inward clamping force on the annular inclined surfaces that moves and wedges the wedge-shaped grippers in an axial direction between the annular inclined surfaces and the pipe.

BRIEF DESCRIPTION OF THE DRAWINGS

The present invention will be understood and appreciated more fully from the following detailed description, taken in conjunction with the drawings in which.

DETAILED DESCRIPTION OF EXEMPLARY EMBODIMENTS

Figure 1:
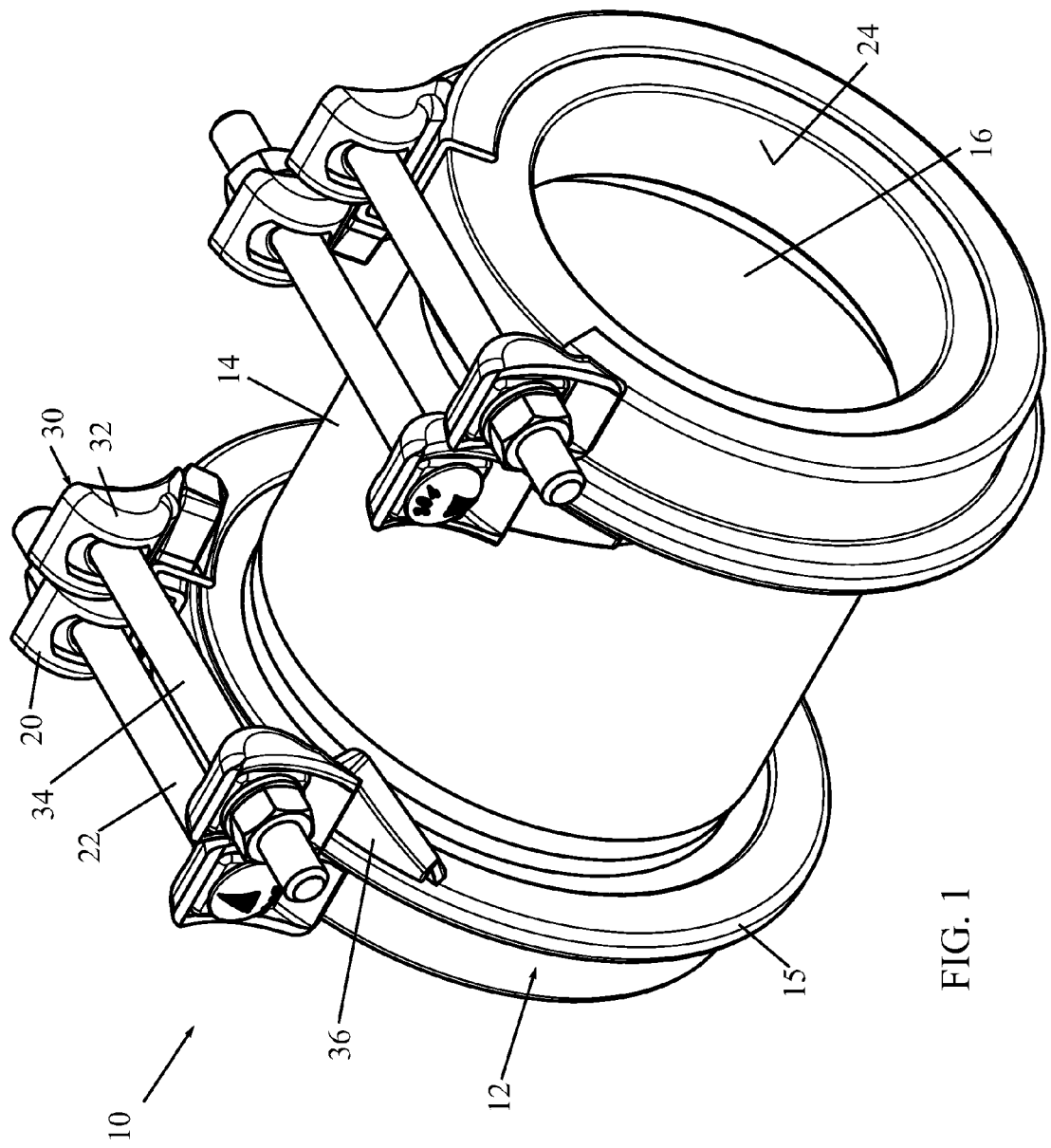
FIG. 1 is a simplified pictorial illustration of a pipe coupling, constructed and operative in accordance with a non-limiting embodiment of the present invention.
Figure 2:
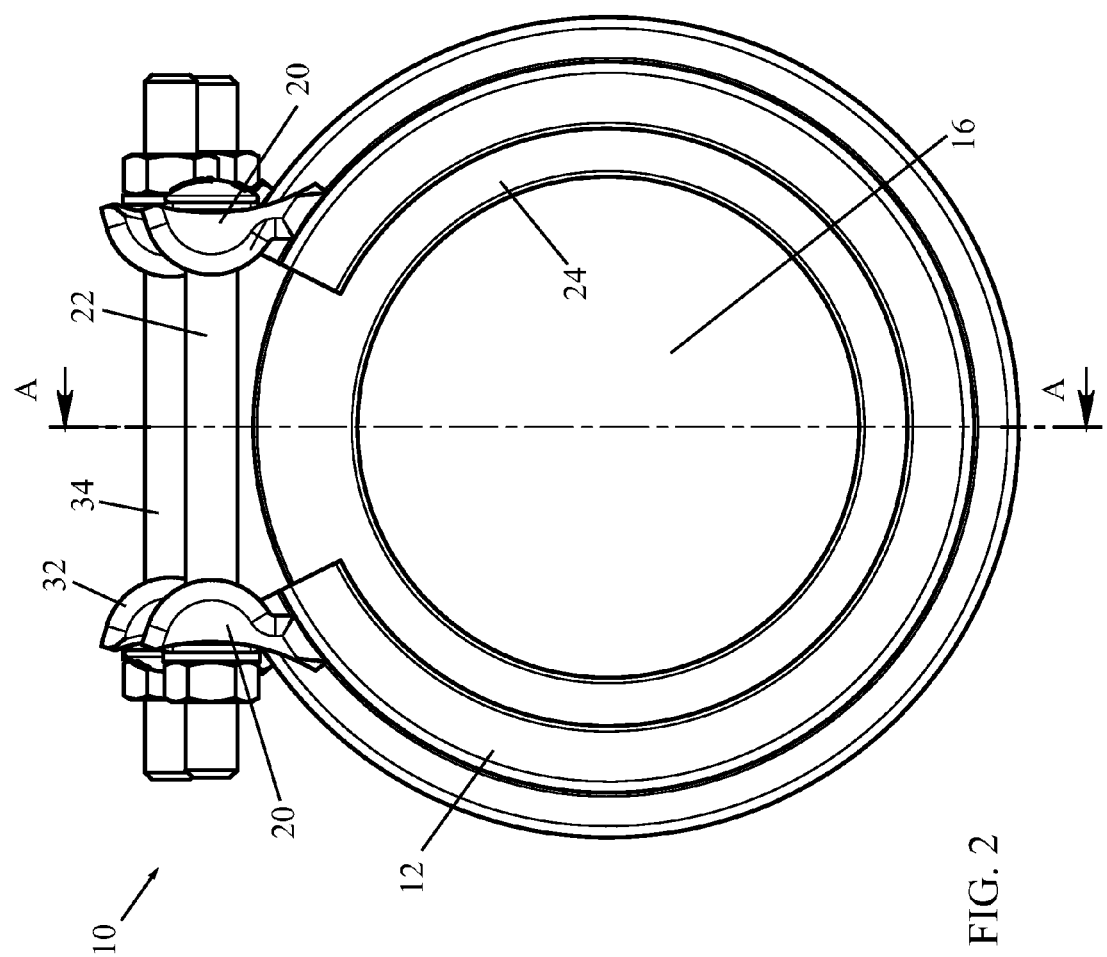
FIG. 2 is an end-view illustration of the pipe coupling of FIG. 1.
Figure 3:
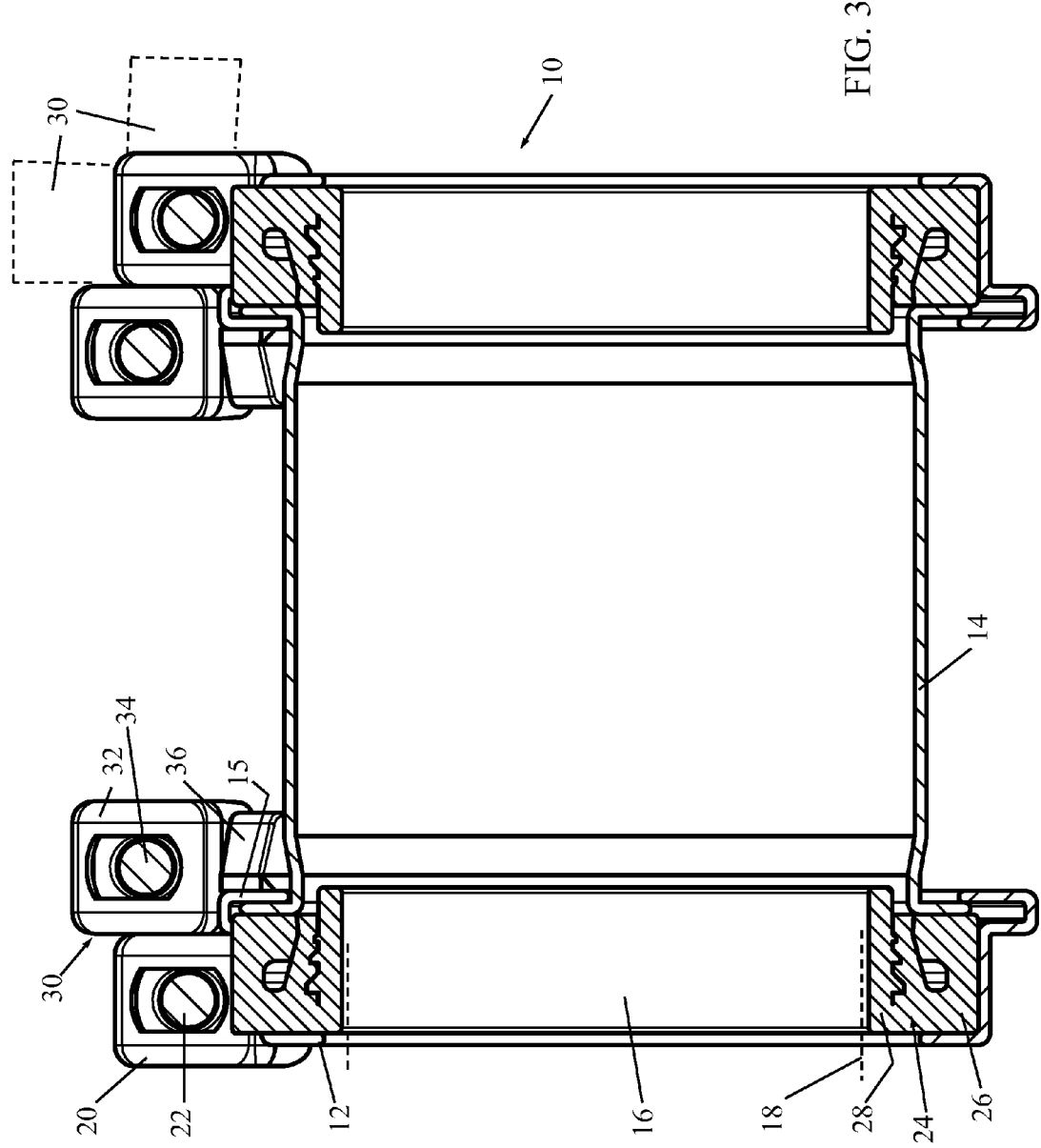
FIG. 3 is an axial cross-sectional view taken along lines A-A in FIG. 2.

Reference is now made to FIGS. 1-3, which illustrate a pipe coupling 10, constructed and operative in accordance with a non-limiting embodiment of the present invention.

Pipe coupling 10 includes at least one annular clamp housing 12 at an end of a (preferably, but not necessarily, cylindrical) body 14. In the illustrated embodiment, there are two such annular clamp housings 12 at opposite ends of cylindrical body 14. Annular clamp housing 12 has an opening 16 for inserting therein a pipe 18 (shown in broken lines in FIG. 3 only). Annular clamp housing 12 has two clamp members 20 and a tightening element 22 (e.g., one or more mechanical fasteners, such as a bolt or screw and a tightening nut, and possibly washer) that fastens and tightens clamp members 20 towards each other in a direction transverse to the axial length of body 14 of pipe coupling 10 so as to apply a radially-inward clamping force on pipe 18 inserted in opening 16.

In the preferred embodiment, annular clamp housing 12 includes an annular seal member 24 into which the pipe 18 is received. Annular seal member 24, which may be made of a natural or artificial elastomeric material, is radially squeezed and sealingly clamped against the outside surface of pipe 18 when tightening element 22 fastens and tightens clamp members 20 towards each other. Annular seal member 24 may include an outer loop member 26 from which extends an inner annular portion 28. The inner annular portion 28 may be removed from the outer loop member 26 (e.g., by cutting, tearing, breaking and the like) so that annular seal member 24 can accept different diameters of pipes. On release of tightening element 22, annular clamp housing 12 and annular seal member 24 return to their original dimensions to form an opening through which an existing pipe can be removed without obstruction, and a new pipe installed.

Annular clamp housing 12 may be manufactured as a thin-wall unitary metal casting. The walls may be reinforced by integral ribs (not shown) as in US Patent Application 20070273151.

In the illustrated embodiment, clamp members 20 are mounted or integrally formed on a flange 15 that extends from an end of cylindrical body 14. It is noted that flange 15 extends over a portion of annular seal member 24 (over the top edge of outer loop member 26).

In accordance with a non-limiting embodiment of the present invention, at least one auxiliary clamp 30 with auxiliary clamp members 32 is located near the at least one annular clamp housing 12. In the illustrated embodiment, there are two such auxiliary clamps 30 at opposite ends of cylindrical body 14. Clamp members 32 may be fashioned similarly to clamp members 20. In the illustrated embodiment, auxiliary clamp 30 and clamp members 32 are positioned axially inwards of annular clamp housing 12. Clamp members 32 are secured to flange 15 with lugs 36. Lugs 36 are either secured to flange 15 (e.g., by welding) or are integrally formed with flange 15 (e.g., by casting).

An auxiliary tightening element 34 (e.g., one or more mechanical fasteners, such as a bolt or screw and a tightening nut, and possibly washer) fastens and tightens clamp members 32 towards each other in a direction transverse to the axial length of body 14 of pipe coupling 10 so as to apply a radially-inward clamping force on pipe 18 inserted in opening 16. The juxtaposition of clamp members 32 to flange 15 that extends over annular seal member 24 (over the top edge of outer loop member 26) ensures that the necessary radial clamping force is applied to annular seal member 24. Thus, by tightening clamp members 20 and auxiliary clamp members 32, an extremely reliable tight seal is provided by pipe coupling 10 on any pipe or pipes. Moreover, auxiliary clamp members 32 provide redundancy; that is, even in the unlikely event that tightening element 22 were to fail or be deliberately destroyed or removed, someone were to cut, auxiliary clamp members 32 would continue to provide the necessary clamping force and the seal on the pipe would remain intact.

In accordance with other non-limiting embodiments of the present invention, the at least one auxiliary clamp 30 with clamp members 32 may be located at other positions near the at least one annular clamp housing 12. For example, as shown in broken lines in FIG. 3, auxiliary clamp 30 with clamp members 32 may be located radially outwards or axially outwards of annular clamp housing 12.

It is noted that the auxiliary clamp 30 with clamp members 32 may also be used in conjunction with the pipe coupling of U.S. Pat. No. 7,571,940, issued on 11 Aug. 2009 to the present inventors, the disclosure of which is incorporated herein by reference. U.S. Pat. No. 7,571,940 describes a removable, radial band-type coupling for pipes, which not only has excellent sealing properties, but which also has excellent resistance to axial mechanical forces that tend to separate the coupled pipes.

Figure 4:
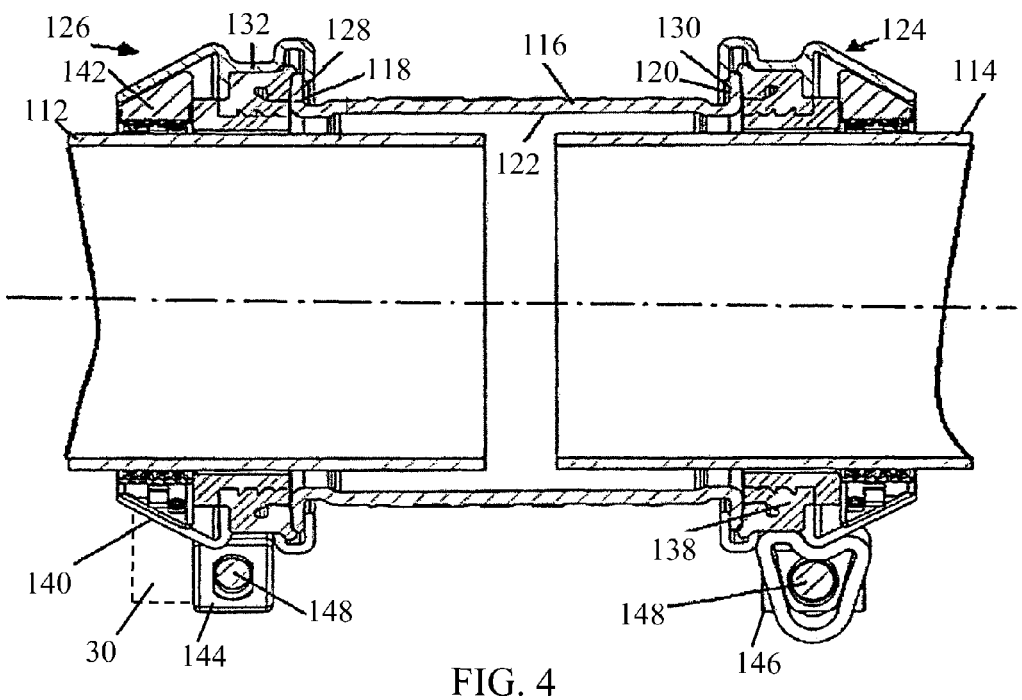
FIG. 4 is a simplified pictorial illustration of a pipe coupling, constructed and operative in accordance with another non-limiting embodiment of the present invention.

The pipe coupling of U.S. Pat. No. 7,571,940 is shown with auxiliary clamp 30 in broken lines in FIG. 4, connecting pipes 112 and 114.

Briefly, a central housing 116 has a cross-section resembling a wide, low-wall channel, with channel walls 118 and 120 that face away from the center of the pipes 112 and 114. The inner diameter 122 of central housing 116 is slightly larger than the diameter of the largest pipe to be coupled thereby.

Two curved outer clamp members 124 and 126, which have annular inclined surfaces 140, are each configured to make side contact with an inner face 128 of a central housing wall 130. A central portion 132 of outer clamp members 124, 126 houses a hydraulic seal element 138. The annular inclined surfaces 140 abut against (elastomeric) wedge-shaped grippers 142.

A pair of clamping members 144 and 146 extend from each of outer clamp members 124 and 126, respectively. The tightening elements 148 fasten the clamp members 144 or 146 towards each other in a direction transverse to the axial length so as to apply a radially-inward clamping force on the pipes 112 and 114, and a radially-inward clamping force on the annular inclined surfaces 140 of clamp members 124 and 126 that moves and wedges the wedge-shaped grippers 142 in an axial direction between annular inclined surfaces 140 and the pipes 112 and 114. The wedging action provides excellent resistance to axial mechanical forces that tend to separate the coupled pipes. As before, the addition of auxiliary clamp 30 provides added reliability and clamping power.

The scope of the present invention includes both combinations and subcombinations of the features described hereinabove as well as modifications and variations thereof which would occur to a person of skill in the art upon reading the foregoing description and which are not in the prior art.

What is claimed is:

1. A pipe coupling comprising:
   at least one annular clamp housing at an end of a body, said at least one annular clamp housing having an opening for inserting therein a pipe and comprising clamp members and a tightening element that fastens and tightens said clamp members towards each other in a direction transverse to an axial length of said body so as to apply a radially-inward clamping force on a pipe inserted in said opening;
   at least one auxiliary clamp comprising auxiliary clamp members located near said at least one annular clamp housing; and
   an auxiliary tightening element that fastens and tightens said auxiliary clamp members towards each other in a direction transverse to the axial length of said body so as to apply a radially-inward clamping force on the pipe inserted in said opening.

2. The pipe coupling according to claim 1, wherein said at least one annular clamp housing comprises an annular seal member which is radially squeezed when at least one of said tightening element and said auxiliary tightening element is tightened.

3. The pipe coupling according to claim 1, wherein said clamp members are mounted or integrally formed on a flange that extends from an end of said body.

4. The pipe coupling according to claim 2, wherein said clamp members are mounted or integrally formed on a flange that extends from an end of said body, said flange extending over a portion of said annular seal member.

5. The pipe coupling according to claim 1, wherein said at least one auxiliary clamp is positioned axially inwards of said at least one annular clamp housing.

6. The pipe coupling according to claim 1, wherein said at least one auxiliary clamp is positioned axially outwards of said at least one annular clamp housing.

7. The pipe coupling according to claim 1, wherein said at least one auxiliary clamp is positioned radially outwards of said at least one annular clamp housing.

8. The pipe coupling according to claim 3, wherein said auxiliary clamp members are secured to said flange with lugs.

9. The pipe coupling according to claim 4, wherein said auxiliary clamp members are secured to said flange with lugs.

10. The pipe coupling according to claim 1, further comprising an annular inclined surface extending axially from each of said clamp members, and a wedge-shaped gripper arranged for sliding and abutting against each of said annular inclined surfaces, wherein tightening at least one of said tightening element and said auxiliary tightening element applies a radially-inward clamping force on the pipe and a radially-inward clamping force on said annular inclined surfaces that moves and wedges said wedge-shaped grippers in an axial direction between said annular inclined surfaces and the pipe.

* * * * *